United States Patent [19]

Morimoto et al.

[11] Patent Number: 4,849,962
[45] Date of Patent: Jul. 18, 1989

[54] COMMUNICATIONS CONTROL UNIT

[75] Inventors: Shigeki Morimoto; Toshiaki Koyama, both of Hadano, Japan

[73] Assignee: Hitachi, Ltd., Tokyo, Japan

[21] Appl. No.: 153,610

[22] Filed: Feb. 8, 1988

[30] Foreign Application Priority Data

Mar. 4, 1987 [JP] Japan .................................. 62-47530

[51] Int. Cl.⁴ .............................................. H04L 5/14
[52] U.S. Cl. ...................... 370/29; 379/290; 379/384
[58] Field of Search ....................... 370/24, 29, 32, 31, 370/68.1, 110.1; 379/165, 290, 384, 269

[56] References Cited

U.S. PATENT DOCUMENTS

| 4,105,876 | 8/1978 | Farrell et al. | 379/290 |
| 4,145,574 | 3/1979 | Wintzer | 370/29 |
| 4,599,719 | 7/1986 | Breen et al. | 370/24 |
| 4,644,525 | 2/1967 | Ellis et al. | 370/24 |

FOREIGN PATENT DOCUMENTS

B30-3743 1/1955 Japan .

Primary Examiner—Douglas W. Olms
Assistant Examiner—Frank M. Scutch, III
Attorney, Agent, or Firm—Antonelli, Terry & Wands

[57] ABSTRACT

In communications control unit for sequentially scanning a plurality of line sets to which full-duplex lines are connected, for reading out line control word provided in correspondence to the line from a memory when a data transmission/reception request exists in the line set, and for executing the data transmitting and receiving operations with the relevant line set, one line control word including both of transmission control information and reception control information is read out in the time slot assigned to one full-duplex line, and the data transmitting and receiving operations are simultaneously executed.

6 Claims, 4 Drawing Sheets

COMMUNICATIONS CONTROL UNIT

BACKGROUND OF THE INVENTION

The present invention relates to a communications control unit for scanning a number of lines and for transmitting and receiving data on a time-sharing basis; and, more particularly, to a communications control unit for efficiently transmitting and receiving data on full-duplex lines.

Hitherto, as a system for transmitting and receiving data by scanning a plurality of lines, there has been known a line scanning system disclosed in JP-No.-B-55-3743 or the like. According to this system, the information bits which are transferred from each line are assembled to construct one character, the constructed character is set into an assembly buffer area in a line control word memory which is provided in correspondence to each line and upon completion of the construction of one character, a flag bit indicative of the completion of the construction of one character is also set into this line control word. On the other hand, a line controller scans the flag bit in the line control word memory for every line. For the line in which a character is not constructed yet, only the flag bit is checked and the next line is then scanned. With respect to the line in which the character has already been constructed, if this character should be transferred to an upper data processor, it is transferred and thereafter, the next line is scanned. The transmission is executed by operations which are opposite to the receiving operations mentioned above. Namely, the line controller scans the line control word memory for every line and checks for a flag bit indicating that the character which had previously been transferred to the buffer area in the line control word memory has been transferred to the line. If this flag bit is set and the data to be subsequently transmitted exists, the next character is transferred. Thereafter, the next line is examined.

According to this system, in the case of the half-duplex line, only either the reception or the transmission is executed at one time by use of one line control word. By alternately performing the reception control and transmission control, the transmitting and receiving operations of data are executed.

In the foregoing conventional technique, in the case of the full-duplex line, the line is handled as two half-duplex lines in such a manner that two line control words are used and two time slots are taken for examining the line, thereby executing the transmitting/receiving operations. Namely, the line control word for reception is checked by one time slot and the line control word for transmission is examined by the other time slot. Therefore, the processing time for the full-duplex line is twice as long as that for the half-duplex line. Thus, in the case of supporting a high speed line by this line controller, there is a problem that assuming that the line speeds are the same, the full-duplex lines as many as only half of the number of half-duplex lines can be processed.

On the other hand, in the case of controlling the transmitting side depending on the state of the receiving side, there is a problem that a special hardware to communicate between the receiving side and the transmitting side is necessary.

SUMMARY OF THE INVENTION

It is an object of the present invention to improve the processing capability for the full-duplex lines and to achieve a processing time equal to that for the half-duplex lines.

This object is accomplished by reading a single line control word, including both transmission control information and reception control information, within a time slot assigned to one full-duplex line and simultaneously executing a data transmitting operation and a data receiving operation.

DESCRIPTION OF THE PREFERRED EMBODIMENTS

An embodiment of the present invention will be described hereinbelow with reference to the drawings.

Figure 1:
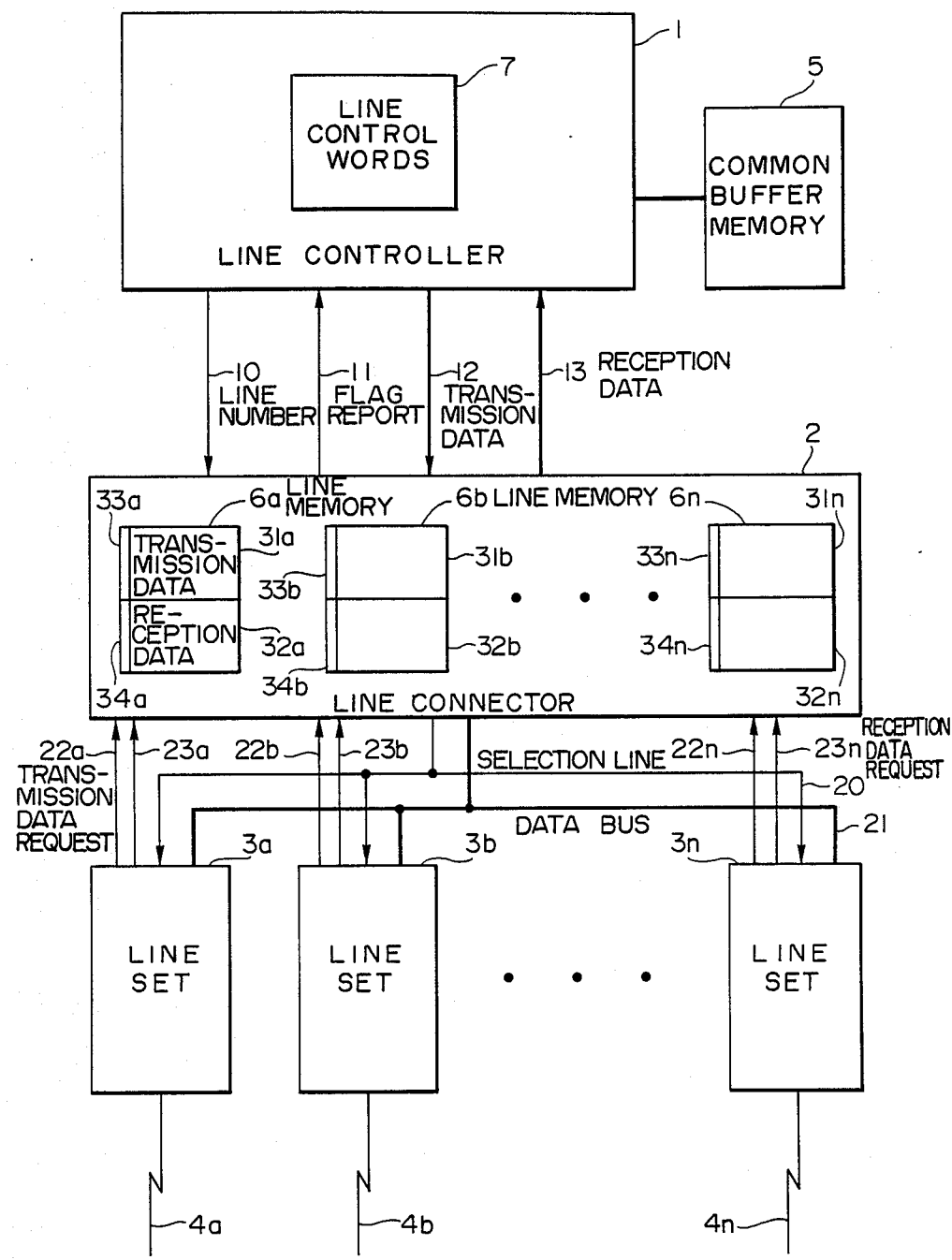
FIG. 1 is a constitutional diagram showing a constitution of an embodiment of the present invention.

FIG. 1 is a diagram showing the configuration of an embodiment of a line control system of the invention. In FIG. 1, reference numeral 1 denotes a line controller; 2 is a line connector; and 3a to 3n indicate line sets. Full-duplex data lines 4a to 4n are connected to the line sets 3a to 3n, respectively. Line memories 6a to 6n are provided in the line connector 2 in correspondence to the lines 4a to 4n respectively. A memory 7 in which line control words are stored is provided in the line controller 1. The line control word has information regarding the operation of each line. A common buffer memory 5 to store transmission/reception data is connected to the line controller 1.

The line controller 1 is connected to the line connector 2 through a signal line 10 to indicate the line number, a signal line 11 to report the state of the flag, a signal line 12 to transfer the transmission data, and a signal line 13 to transfer the reception data.

The line connector 2 is connected to the line sets 3a to 3n through a line set selection line 20 which is common to all of the line sets, a data bus 21, and transmission data request lines 22a to 22n and reception data request lines 23a to 23n which are individually provided for the line sets 3a to 3n respectively.

The line memories 6a to 6n are constituted by transmission data storage areas 31a to 31n, reception data storage areas 32a to 32n, flag bits 33a to 33n, and flag bits 34a to 34n, respectively. The flag bits 33a to 33n indicate the presence or absence of the transmission data in the transmission data storage areas 31a to 31n. The flag bits 34a to 34n indicate the presence or absence of the reception data in the reception data storage areas 32a to 32n.

In the data receiving mode, the data which was bit-serially input from the lines is formed into characters by the line sets 3. When the data of one character is constructed, the line sets 3 activate their reception data request lines 23a to 23n, thereby requesting the line connector 2 to fetch the data. The line connector 2 selects the line set 3 corresponding to the activated reception data request line 23 through the line set selection line 22 and fetches the data and writes it into the reception data storage areas 32a to 32n in the line memories 6a to 6n corresponding to the relevant line. At the same time, the corresponding one of the flag bits 34a to 34n indicative of the presence of the reception data is set to 1. When the data is fetched to the line connector 2, the line set 3 resets the reception data request line 23 to prepare for the next request.

The line controller 1 time-sharingly scans the line memories 6a to 6n, thereby checking the flag bits 34a to 34n indicative of the presence of the reception data. The signal line 10 to indicate the line number is used to indicate the number of the line which is at present being scanned. The values of the flag bits are indicated to the line controller 1 through the signal line 11. If the value of the flag bit 34 is "1" indicating the presence of the reception data, the content of the relevant reception data storage area 32 is transferred to the line controller 1 through the signal line 13 and written into the common buffer memory 5. At the same time, the flag bit 34 representative of the presence of the transmission data is reset to "0".

In the data transmitting mode, the line controller 1 time-sharingly scans the line memories 6a to 6n, thereby checking the flag bits 33a to 33n indicative of the presence of transmission data. The signal line 10 is used to indicate the number of the line which is at present being scanned. The values of the flag bits are indicated to the line controller through the signal line 11. If the value of the flag bit 33 is "0" indicating a request for transmission data, the content of the common buffer memory 5 is read out and transferred to the line connector 2 through the signal line 12 and written into the transmission data storage area 31 in the line memory 6. At the same time, the flag bit 33 is set to "1".

When the data to be transmitted to the lines has been exhausted, the line set 3 activates the transmission data request lines 22a to 22n, thereby requesting the line connector 2 to set the next data. The line connector 2 selects the line set corresponding to the activated transmission data request line 22 by the line set selection line 20. The content of the transmission data storage area 31 in the line memory 6 corresponding to the relevant line is sent to the line set through the data bus 21. Simultaneously with this process, the flag bit 33 indicative of the presence of the transmission data is reset to "0". When the data is set, the line set 3 resets the transmission data request line 22. The data set in the line set 3 is bit-serially dissolved and transmitted to the line.

Figure 2:
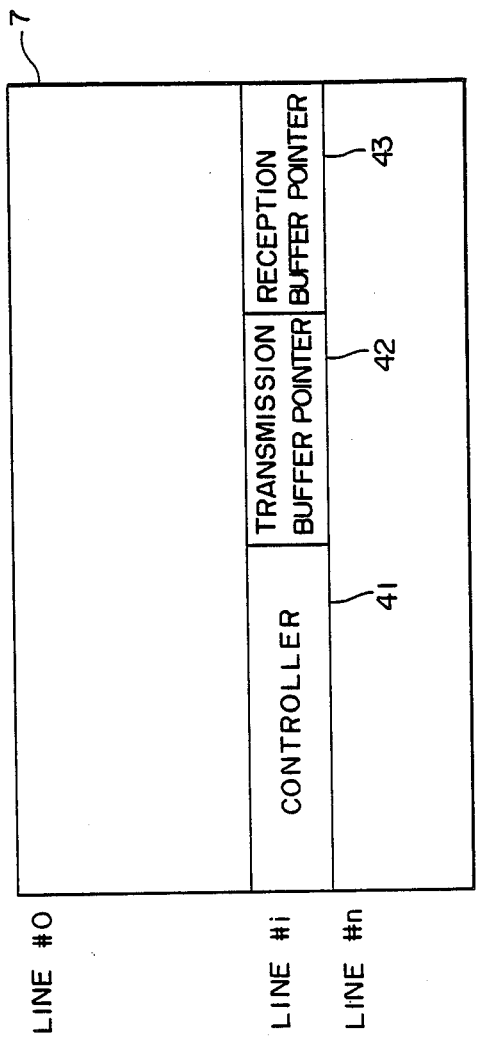
FIG. 2 is a format diagram of line control words shown in FIG. 1.

FIG. 2 shows a format of line control words which are stored in the memory 7. The line control word of one line comprises a controller 41, a transmission buffer pointer 42, and a reception buffer pointer 43 as shown in the diagram. The information indicative of the attribute or operating state of the relevant line is stored in the controller 41. The transmission buffer pointer 42 and reception buffer pointer 43 indicate addresses in the transmission buffer and reception buffer in the common buffer memory 5. The controller 41 is common to transmission and reception.

Figure 3:
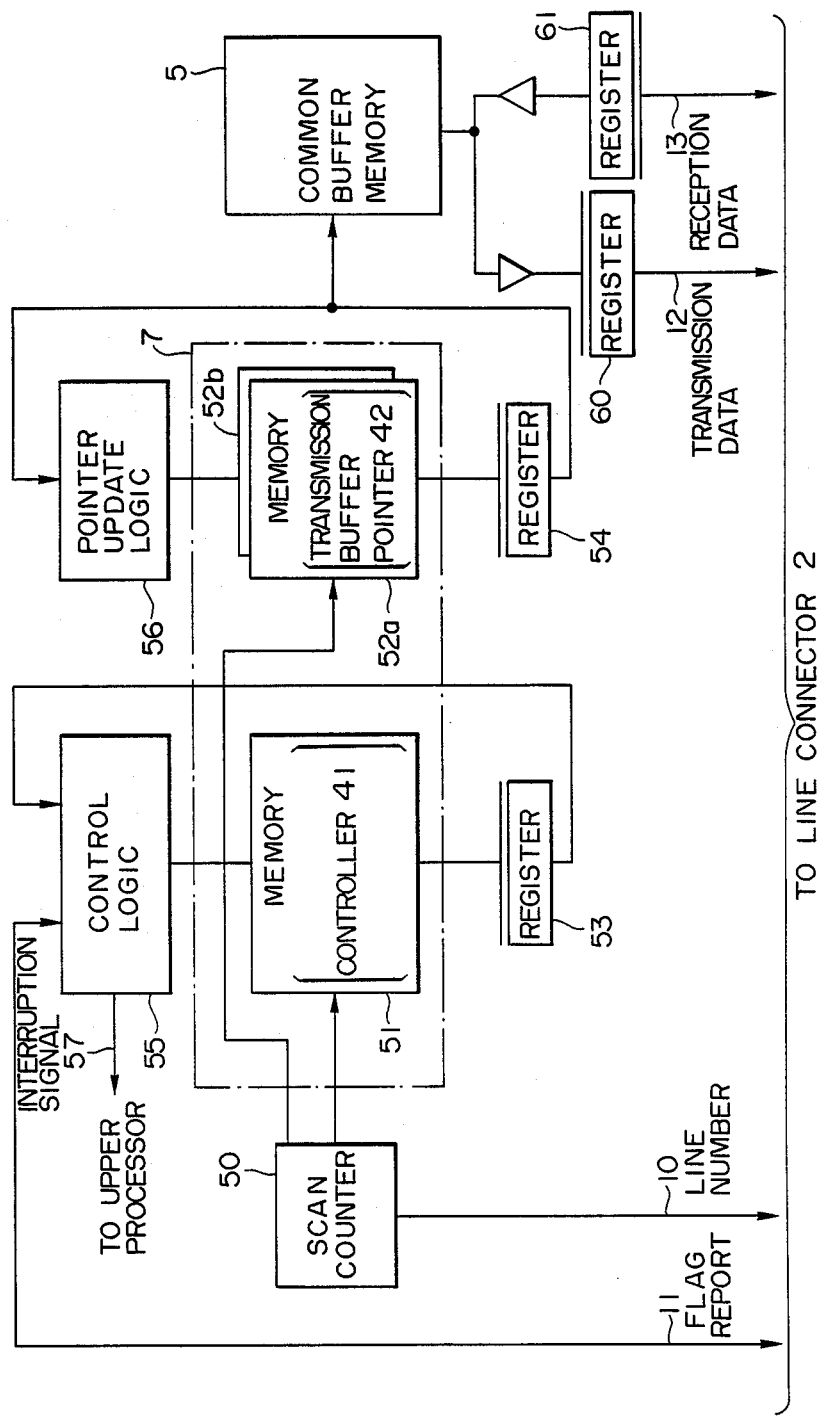
FIG. 3 is a block diagram showing a constitution of a line controller shown in FIG. 1.

FIG. 3 shows a detailed example of the line controller 1. However, the portions which are not directly concerned with the line control system of the invention are omitted. In FIG. 3, reference numerals 51, 52a, and 52b denote parts of the memory 7 which store the line control words. The controller 41 shown in FIG. 2 is stored in the memory 51. The transmission buffer pointer 42 and reception buffer pointer 43 are stored in the memories 52a and 52b, respectively. Numeral 53 denotes a read register of the memory 51. Numeral 54 represents a read register of the memories 52a and 52b. Numeral 50 indicates a scan counter to generate the line number. The lines are sequentially scanned in accordance with an output of the scan counter 50.

In a time slot of a certain line, the line number which been output from the scan counter 50 is sent to the line connector 2 through the signal line 10. Thus, the line connector 2 reads out the content of the line memory 6 corresponding to the relevant line and sends the flag bit 33 and the flag bit 34 onto the signal line 11. On the other hand, the output of the scan counter 50 is used as the memory addresses in the memories 51, 52a, and 52b. The line control word in the memory 7 corresponding to the relevant line is read into the registers 53 and 54.

By inputting the content of the signal line 11 to report the value of the flag and the content of the register 53 to a control logic 55, the following processes are executed. Namely, in the case of transferring the data from the line controller 1 to the line connector 2, the data in the common buffer memory 5 addressed by the content of the register 54 is transmitted through a common memory read register 60 and transferred to the line connector 2 via the signal line 12. On the otherhand, when transferring the reception data from the line connector 2 to the line controller 1, the data sent to a common memory write register 61 through the signal line 13 is written at the location in the common buffer memory which is indicated by the content of the register 54. Finally, in dependence on the value indicated in the controller 41 of the line control word, the operation to interrupt an upper processor (not shown in FIG. 3) through an interruption signal line 57 may be also performed.

As the result of the foregoing processes, the content of the controller 41 of the line control word is updated by the control logic 55 and stored into the memory 51. On the other hand, if the data was read out from or written into the common buffer memory 5, the values of the transmission buffer pointer 42 and reception buffer pointer 43 are increased by "1" by a pointer update logic 56 and stored into the memories 52a and 52b, respectively.

Figure 4:
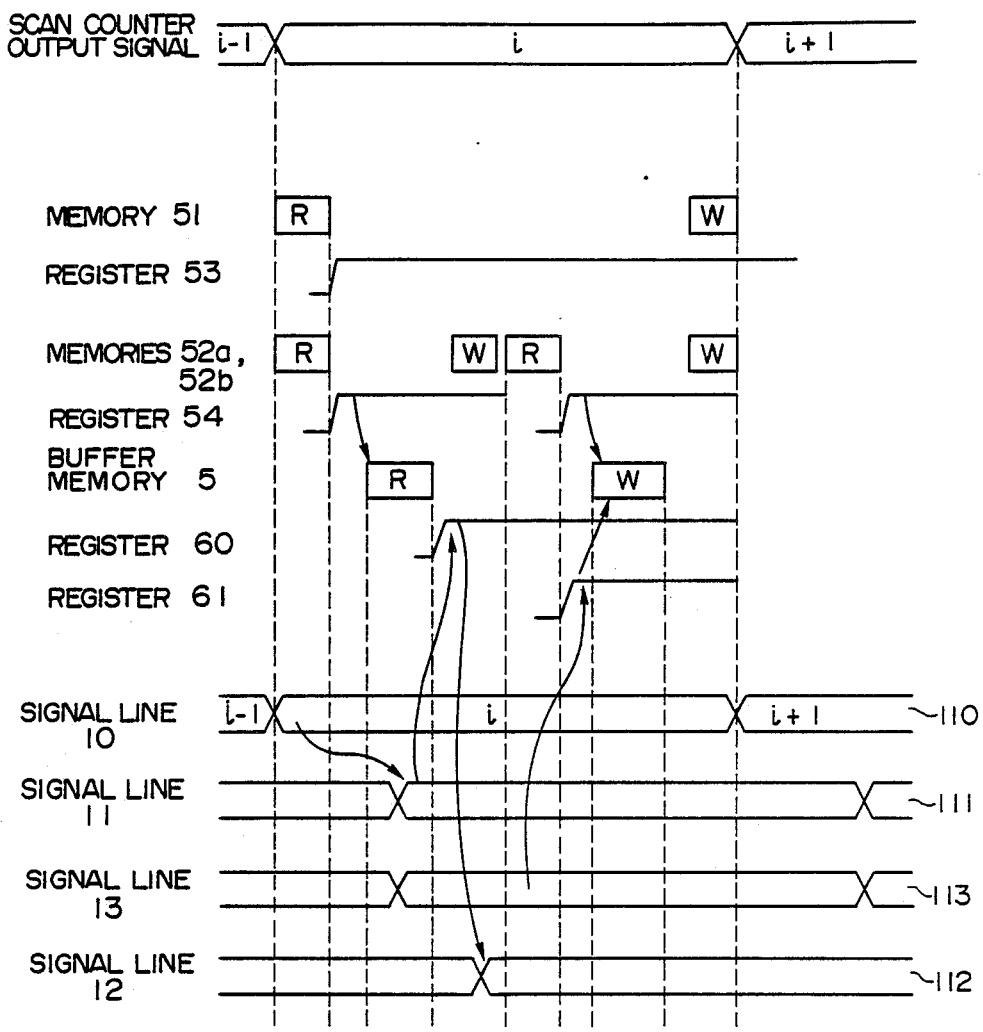
FIG. 4 is a timing chart showing the operation in each section in one time slot.

FIG. 4 is a timing chart showing the operation of each section in one time slot for a certain line. In the diagram, R denotes a reading operation from the memory and W indicates a writing operation into the memory. When the scan counter 50 outputs a signal indicative of the line number i, this signal is sent to the line connector 2 through the signal line 10. At the same time, the contents of the memories 51 and 52a are read out and set into the registers 53 and 54, respectively. The line controller 1 receives the flag bits 33 and 34 via the signal line 11. When the content in the common buffer memory 5 is read out by the transmission buffer pointer 42 in the register 54 and the transmission data is set into the register 60, it is transferred to the line connector 2 through the signal line 12 by the control of the control logic 55. Then after the updated transmission buffer pointer 42 has been written into the memory 52b, the content of the memory 52b is read out and set into the register 54. Since the line controller 1 receives the reception data via the register 61 through the signal line 13, the common buffer memory 5 is accessed using the content of the register 54 as an address. The content of the register 61 is written into the common buffer memory 5. Thereafter, the updated reception buffer pointer 43 is written into the memory 52b. Finally, the updated controller 41 is written into the memory 51 and this time slot is finished. Next, the scan counter 50 is updated to i+1 and the foregoing operations are repeated for the line having the line number i+1. However, when the flag does not request the transmission data or reception data, the memory 52a or 52b is not updated.

In the embodiment, when the memory 7 to store the line control words is accessed, by individually accessing the transmission buffer pointer 42 and reception buffer pointer 43 in two memory cycles, the memory 7 whose read/write data widths are narrow can be used. However, by widening the read/write data widths in the memory, the transmission buffer pointer 42 and reception buffer pointer 43 can be also simultaneously accessed in a single memory cycle.

It is also possible to shift the function of the line connector 2 to the line set 3 so that the line set 3 has the line memory 6 and still execute the foregoing processes. On the other hand, it will be obvious that the line connector 2 also can be included in the line controller 1.

As explained above, in the full-duplex line, the processes regarding both of the transmission and the reception are executed in one time slot given to the relevant line. In the case of the half-duplex line, only the processes regarding either the transmission or the reception are performed in one time slot. By successively executing the foregoing processes by changing the output of the scan counter 50, a plurality of lines can be controlled.

In the embodiment, the processes regarding both of the transmission and the reception are performed in one time slot. However, the single time slot is not prolonged as compared with that in the case where the processes regarding only either the transmission or the reception are executed. This is because the signal lines between the line controller 1 and the line connector 2 are divided into the signal lines regarding the transmission and the signal lines regarding the reception and the logic in each section also independently operates in the transmitting and receiving modes. The reading and writing operations of the buffer pointers can be executed in parallel with the data transfer between the line controller 1 and the line connector 2. Therefore, even when the transmission buffer pointer 42 and reception buffer pointer 43 are separately accessed in two memory cycles, no influence is exerted.

According to the embodiment, the full-duplex lines and half-duplex lines can be controlled at the same time slot period of time. On the other hand, since the information regarding both of the transmission and the reception is included in one line control word, a process such as an echo back or the like which is executed synchronously with the transmission and reception can be easily performed without needing a special hardware.

According to the invention, in the case of time-sharingly scanning and processing a plurality of full-duplex lines, both of the transmitting and receiving operations can be executed in one time slot assigned to each line, so that the full-duplex lines and half-duplex lines can be processed at the same line speed with respect to the same number of lines. On the other hand, since the information regarding both of the transmitting and receiving operations is included in one line control word, the processes to be executed synchronously with the transmission and reception can be easily performed without using a hardware for communication between the transmission and the reception.

We claim:

1. A communications control unit comprising:
    a plurality of line sets to each of which a full-dupex line is connected and each of which includes means for forming character data from bit serial data received from said line and for converting character data into bit serial data to be transmitted to said line; and
    a line oontroller having a control memory in which a respective line control word is stored for each line, means for sequentially scanning said plurality of line sets, means for reading out said line control word from said control memory when a data transmission/reception request exists in the relevant line set, and means for simultaneously executing data transmitting and receiving operations with said line set in response to said line control word and said data transmission/reception request in a single time slot assigned to one of the lines.

2. A communications control unit comprising:
    a plurality of line sets to each of which a full-duplex line is connected and each of which includes means for forming character data from bit serial data received from said line and for converting character data into bit serial data to be transmitted to said line; and
    a line connector having a first memory for storing transmission data, a flag bit indicative of the presence or absence or said transmission data stored in said first memory, reception data and a flag bit indicative of the presence or absence of said reception data stored in said first memory for each line, means for transmitting and receiving said transmission data and said reception data with the line set where a data transmission/reception request exists and means for setting said flag bits in accordance with the presence or absence of the transmission and reception data; and
    a line controller having a second memory in which a respective line control word is stored for each line, means for sequentially scanning said plurality of lines via said line connector, means for reading out said line control word from the second memory when said flag bits in said first memory corresponding to the line being scanned indicate the absence of transmission data and/or the presence of the reception data, a buffer memory for storing transmission data and reception data and means for simultaneously executing data transmitting and receiving operations between said buffer memory and said first memory in a single time slot assigned to one of the lines.

3. A communications control unit according to claim 1, wherein said line controller includes a buffer memory for storing transmission data and reception data, first register means connected between said buffer memory and a transmission line for holding transmission data to be sent to said line sets via said transmission line, and second register means connected between said buffer memory and a reception line for holding reception data received from said line sets for storage in said buffer memory.

4. A communications control unit according to claim 3, wherein said control memory stores a transmission buffer pointer and a reception buffer pointer along with said line control word for each line, and said line controller further includes means for accessing said buffer memory to read out transmission data to said first register means and store reception data from said second register means in a single time slot on the basis of a transmission buffer pointer and reception buffer pointer read out of said control memory.

5. A communications control unit according to claim 2, wherein said line controller includes a buffer memory for storing transmission data and reception data, first register means connected between said buffer memory and a transmission line for holding transmission data to be sent to said line sets via said transmission line, and second register means connected between said buffer memory and a reception line for holding reception data received from said line sets for storage in said buffer memory.

6. A communications control unit according to claim 5, wherein said second memory stores a transmission buffer pointer and a reception buffer pointer along with said line control word for each line, and said line controller further includes means for accessing said buffer memory to read out transmission data to said first register means and store reception data from said second register means in a single time slot on the basis of a transmission buffer pointer and reception buffer pointer read out of said second memory.

* * * * *